United States Patent
Ward et al.

(10) Patent No.: US 7,823,365 B2
(45) Date of Patent: Nov. 2, 2010

(54) LOAD BEARING LAMINATES

(75) Inventors: Peter Ward, Nr Wigan (GB); Eric Rowland, Ormskirk (GB); William Henry Brunt, Leigh (GB)

(73) Assignee: Pilkington Group Limited, St. Helens (GB)

( * ) Notice: Subject to any disclaimer, the term of this patent is extended or adjusted under 35 U.S.C. 154(b) by 667 days.

(21) Appl. No.: 10/572,766

(22) PCT Filed: Oct. 15, 2004

(86) PCT No.: PCT/GB2004/004370

§ 371 (c)(1),
(2), (4) Date: Mar. 21, 2006

(87) PCT Pub. No.: WO2005/040537

PCT Pub. Date: May 6, 2005

(65) Prior Publication Data

US 2007/0051452 A1    Mar. 8, 2007

(30) Foreign Application Priority Data

Oct. 17, 2003    (GB) .................... 0324334.2

(51) Int. Cl.
*E06B 3/54*    (2006.01)
(52) U.S. Cl. .............. 52/786.13; 52/171.3; 52/204.593; 52/786.1; 52/796.1; 52/306; 52/204.64; 428/34
(58) Field of Classification Search ................ 52/783.1, 52/786.1, 786.12, 787.1, 786.13, 171.3, 204.593, 52/796.1, 306, 204.64; 428/34
See application file for complete search history.

(56) References Cited

U.S. PATENT DOCUMENTS

| | | | | |
|---|---|---|---|---|
| 3,451,853 A * | 6/1969 | Spahrbier | ............... | 429/36 |
| 3,679,527 A * | 7/1972 | Crick | ............... | 428/34 |
| 4,046,933 A * | 9/1977 | Stefanik | ............... | 428/81 |
| 4,081,581 A * | 3/1978 | Littell, Jr. | ............... | 428/138 |
| 4,343,758 A * | 8/1982 | Goralnik | ............... | 264/254 |
| 4,756,938 A * | 7/1988 | Hickman | ............... | 428/38 |
| 4,893,443 A * | 1/1990 | Haber | ............... | 528/208 |
| 4,912,898 A * | 4/1990 | Holmes | ............... | 52/235 |
| 4,933,227 A * | 6/1990 | Stewart | ............... | 427/192 |
| 5,391,411 A | 2/1995 | Rowland et al. | | |
| 6,138,434 A * | 10/2000 | Demars et al. | ............... | 52/786.13 |
| 6,430,894 B1 * | 8/2002 | Chae et al. | ............... | 52/786.1 |
| 6,449,916 B1 * | 9/2002 | Waters | ............... | 52/455 |
| 7,155,869 B2 * | 1/2007 | Wildenhain et al. | ............... | 52/506.05 |

FOREIGN PATENT DOCUMENTS

| | | |
|---|---|---|
| DE | 297 16 365 U1 | 3/1998 |
| EP | 0 555 991 A2 | 8/1993 |
| FR | 2 777 316 A1 | 10/1999 |

* cited by examiner

*Primary Examiner*—Richard E Chilcot, Jr.
*Assistant Examiner*—Chi Q Nguyen
(74) *Attorney, Agent, or Firm*—Marshall & Melhorn, LLC

(57) ABSTRACT

Laminates comprising at least two glass plys surrounding at least one interlayer having at least one bore extending through the laminate are produced by excluding the interlayer from the area surrounding the bore(s) and positioning a load bearing insert around the bore. The insert may be positioned before or after the laminating process. The invention reduces the tendency for delamination around the area of the bore when the laminate is placed under load.

19 Claims, 2 Drawing Sheets

LOAD BEARING LAMINATES

BACKGROUND OF THE INVENTION

This invention relates to methods for the assembly of laminate panels, to laminates capable of supporting loads and to glass assemblies incorporating such laminates.

Laminated panels, in particular glass laminated panels comprising at least two glass plies joined together by a bonding layer which may be a thermoplastic layer, most commonly polyvinylbutyral (hereinafter for convenience PVB) may be joined together or attached to a supporting structure to form a variety of glass assemblies such as a glass façade. One difficulty which arises in forming such assemblies is that jointing techniques which place a load on the laminate are not ideal. One example is those assemblies which utilise clamping plates joined together by bolts passing through a bore in the laminate. In order to form an assembly comprising such a laminate a force of up to ten tonnes may be applied across the laminate. When the clamp is tightened the bonding layer creeps under the load which detracts from the appearance of the laminate and which may have detrimental consequences.

One type of solution to this problem is described in German patent DE 19812814 and International Patent Application WO 02/38902. In both instances a fixing assembly is positioned in a bore passing through the laminate and fixed in position using a casting resin. This solution is difficult to put into practice and is not entirely effective. There remains a need for a simpler method of joining a laminate to an adjacent structure.

BRIEF SUMMARY OF THE INVENTION

We have discovered that this problem of delamination may be significantly reduced or eliminated by inserting a seal between the glass plies which seal surrounds the bore and excludes the bonding layer from the area surrounding the bore. A load bearing insert may be positioned in the void defined by the plies and the seal.

Accordingly from a first aspect this invention provides a method for the production of a laminated panel comprising a first glass ply, a second glass ply and a bonding interlayer said laminate having at least one bore passing through the panel which is characterized in that prior to the lamination step a seal is positioned between the plies so as to surround the bore or bores thereby excluding the bonding interlayer from an area surrounding the bore or bores.

The invention may be practiced using more than one embodiment. In a first embodiment the seal is positioned around the bore prior to the lamination step and is removed following that lamination step. This may be achieved using a flexible seal e.g. in the form of a flexible silicone rubber disc which can be pushed out of the bore after the lamination step. The result is a laminate having a void surrounding the bore. A load bearing insert is then inserted into the void for example by injecting a castable resin or other suitable material and allowing it to set to form a load bearing material. In an alternative method for practicing this first embodiment the seal comprises a ring of a suitable material which is placed in position surrounding the bore prior to the lamination process. The seal remains in position during and after the lamination process. The result is a laminate having a void surrounding the bore which void is bounded by the seal. A load bearing insert may be injected into this void as described above.

In a second embodiment the seal may comprise a ring of a suitable material which extends around the perimeter of a load bearing insert. The load bearing insert may take the form of an annular disc formed from a suitable material. The disc may be an annulus with a hollow centre large enough to accommodate a fixing bolt. The disc with the seal in position around its perimeter is positioned between the plies prior to the lamination process and remains in place during and after the lamination process.

In this embodiment the thickness of the seal (measured between the opposed faces of the glass plies) will preferably be greater than that of the load bearing insert. Under the application of heat and pressure during the lamination process the seal is compressed and the inner surfaces of the glass plies are pressed into contact with the opposed faces of the load bearing insert. The thickness of the insert is substantially the same as that of the bonding interlayer following the lamination process and the seal is compressed to substantially the same thickness.

The methods of this invention provide a further advantage in comparison with known processes in so far as they are better able to accommodate variations in the thickness of the bonding layer and thereby enable improved laminates to be produced using bonding layers formed from a variety of materials.

The most commonly used interlayer in glass laminates is PVB. PVB is readily available in sheet form. The sheets typically have a thickness of from 0.36 mm to 4.6 mm. PVB sheet may readily be cut to shape. In order to produce a laminate a sheet of PVB may be placed between the glass plies and extending beyond the edges of the plies. The excess PVB is then trimmed off prior to the lamination process.

Other interlayer materials may also be used. One type of interlayer is the ionomer resins including in particular those disclosed in WO 99/58334. Laminates incorporating these interlayers exhibit improved mechanical properties and are thereby particularly advantageous for use in architectural applications. The ionomer resins disclosed in WO99/58334 having a storage Young's Modulus of 50 to 1000 mega pascals at 0.3 Hz and 25° C. determined according to ASTM D 5076.95; a minimum tear energy of at least 15 mega joules per cubic meter determined from tensile tests according to ASTM 638-89 at 25° C. and adhesion to glass of 5 to 42 mega pascals are particularly suitable for use in the methods of the present invention. Resins of this type are commercially available from E.I. DuPont de Nemours under their Trade Marks Surlyn and Sentry Glass Plus (SGP).

These ionomer resins are available in sheet form typically having a thickness of from 0.38 to 4.6 mm more commonly from 1.25 to 2.50 mm. The thickness of a sheet may vary, typically by ±10%. The methods of this invention are effective despite this variation and this represents an advance in the production of laminates incorporating these ionomer resins. The preferred methods of lamination when the bonding interlayer is one of non uniform thickness such as certain ionomer resin interlayers are those wherein the load bearing insert is injected as a fluid and allowed to set following the lamination process.

The methods of this invention may also be used in the production of laminates comprising an interlayer which has been formed by a cast in place process. In a cast in place process the perimeter of the glass plies is sealed e.g. with a tape and the space between the plies is filled with a liquid which is capable of curing to form an interlayer. An example of a suitable class of liquids is epoxy resins. In the methods of this invention the seals must be positioned around the bores prior to the introduction of the liquid. The liquid and thus the cured interlayer is thereby excluded from the area surrounding the bores.

The glass plies used in this invention will normally be formed from conventional soda lime float glass sheets typically having a thickness of from 4 mm to 25 mm more commonly from 6 mm to 19 mm. The glass plies may be the same or different thickness although most commonly the plies used in any one laminate will be the same thickness.

The glass plies may be and preferably are formed from toughened or heat strengthened glass. Where toughened or heat strengthened glass is employed the bores must be drilled prior to toughening. The laminated panels may comprise more than two glass plies and more than one bonding interlayer. Where more than two glass plies are present the outer plies will normally be toughened glass whilst the inner plies may or may not be toughened. In these embodiments the interlayers may be formed from the same material or from different materials.

The laminated panels of this invention may be of various shapes and sizes. They may be flat panels or they may be curved panels. This invention finds particular application in the production of flat panels for architectural use. These are normally formed using toughened glass and are commonly rectangular in shape. Their size is limited in practice to the size of the toughening furnace or the autoclave used in the lamination process and normally their longest dimension will not exceed six meters. This limitation is one reason why there is a need to construct larger assemblies by joining two or more of the panels together.

The glass plies may comprise a plurality of bores always provided that each ply has a set of bores which is aligned with those in the other. Each bore in the laminate is preferably surrounded by an insert excluding the interlayer as hereinbefore described. The number of and the positioning of the bores will vary with the size of the panel and the position in which it is to be mounted. Generally the bores will be circular and have a diameter of from 15 mm to 50 mm. The interlayer will be provided with corresponding concentric holes having a larger diameter, typically from 50 mm to 100 mm. These holes will be cut or punched out from the interlayer before the plies are assembled. The external diameter of the seal should be substantially the same as the internal diameter of the hole in the interlayer so that the seal may be conveniently located in the interlayer.

Where the plies have two or more bores adjacent to each other a single seal surrounding both bores may be employed rather than two separate seals. The load bearing insert will also normally surround both bores in this embodiment.

One type of assembly which may require the joining of laminated panels which are lying in the same plane is the reinforcing fins which are used to support glass facades. These facades can reach great heights and the reinforcing fins reach similar heights by joining a plurality of laminated panels end to end. Another type of assembly is a reinforcing beam for a glass roof which beam may be formed by joining a plurality of laminated panels so as to bridge the span of the roof. A further type of assembly is a laminated glass roofing or facade panel.

BRIEF DESCRIPTION OF THE DRAWINGS

This invention will now be described by reference to the accompanying drawings in which:—

DETAILED DESCRIPTION OF THE INVENTION

Figure 1:
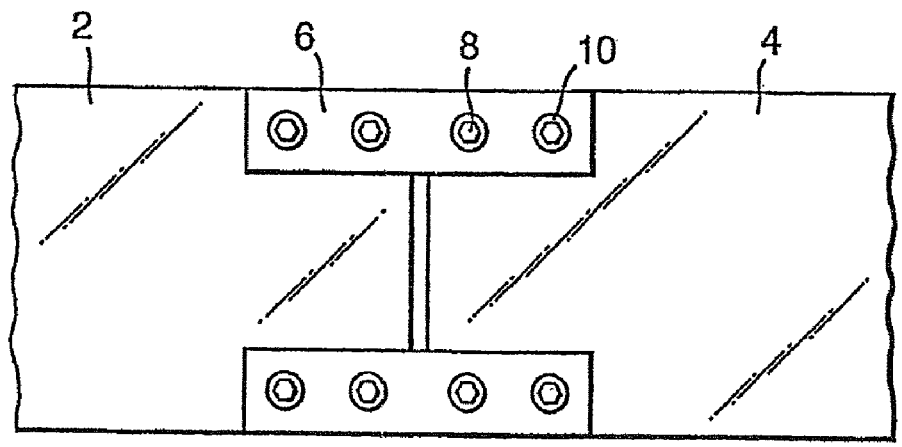
FIG. 1 is a plan view showing two laminated panels jointed together.

FIG. 1 shows two separate laminated panels 2 and 4 which are connected by splice plates 6. Bolt assemblies 8 include washers 10 and pass through plate 6 and one of the panels 2 or 4. The Figure shows eight bolt heads 8 and washers 10 but for clarity only one is identified by these reference numerals.

Figure 2:
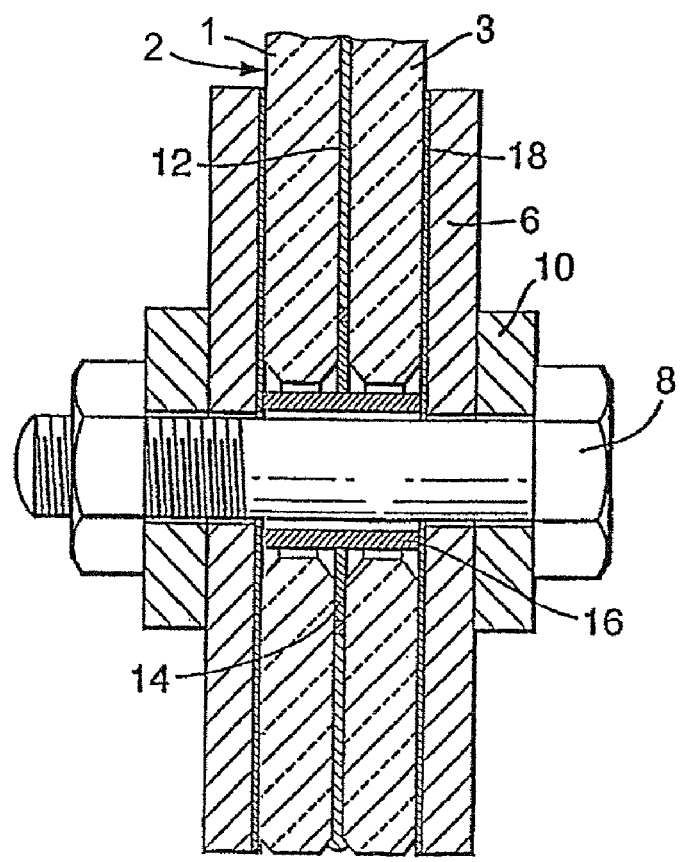
FIG. 2 is a cross section through the assembly of FIG. 1 constructed according to one embodiment of the invention.

FIG. 2 shows a panel 2 comprising plies 1 and 3. Plies 1 and 3 are joined by interlayer 12. Insert 14 lies between plies 1 and 3 and surrounds the bore through which bolt 8 passes. Bush 16 sits in the bore. Plate 6 acts against fibre gasket 18.

Figure 3:
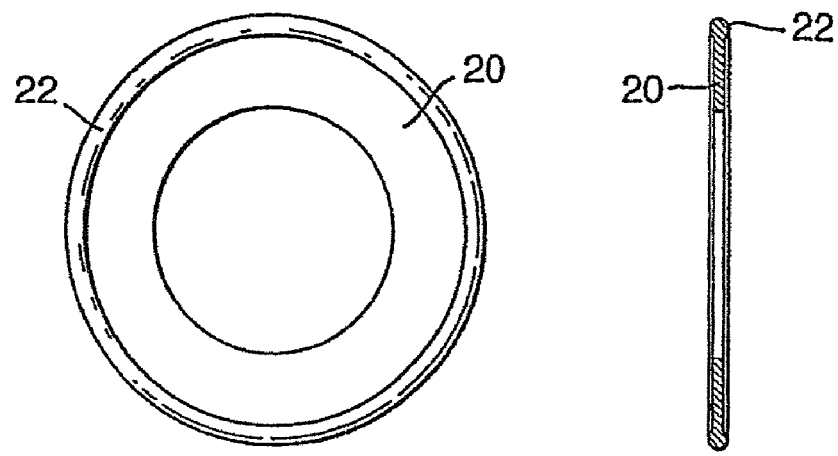
FIG. 3 is a plan and an elevation of an insert as depicted in FIG. 2.

FIG. 3 shows Insert 14. Insert 14 comprises annular disc 20 having a rubber ring 22 extending around its outer circumference.

Figure 4:
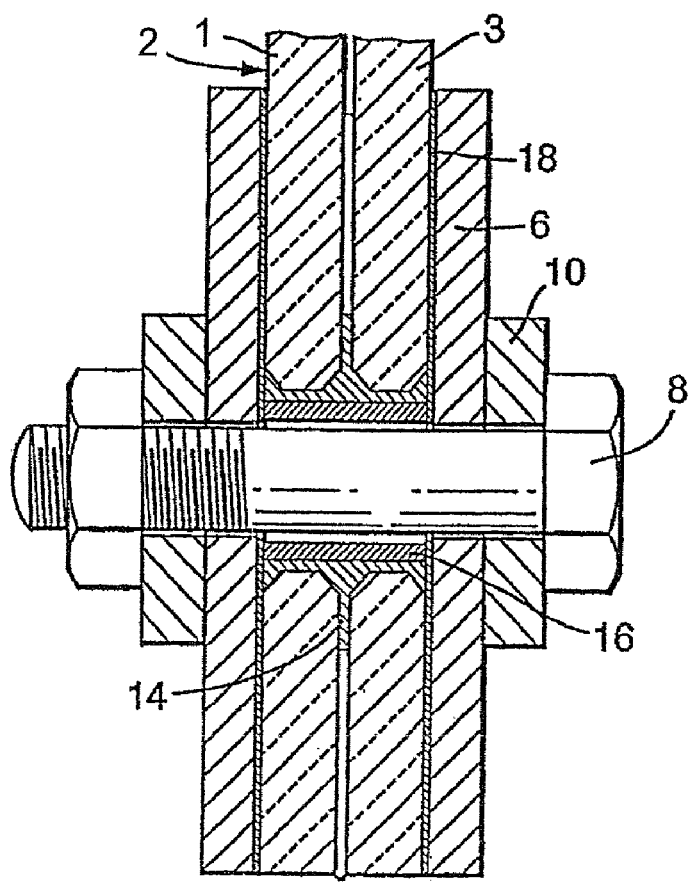
FIG. 4 is a cross section through the assembly of FIG. 1 constructed according to a second embodiment of the invention.

FIG. 4 shows panel 2 comprising plies 1 and 3. Insert 14 occupies the space between bush 16 and plies 1 and 3. Other identifying numerals show in FIG. 4 identify the same feature as is described above in relation to FIG. 2 and are not separately described here.

The assembly of FIG. 2 is constructed by firstly taking two sheets of glass having holes drilled through at corresponding points. Each ply will comprise four separate holes as shown in FIG. 1. One of the plies is laid horizontally and a sheet of interlayer material is placed upon it. The interlayer has circular holes corresponding to each hole in the ply which have a diameter sufficiently large to accommodate Insert 14. Insert 14 comprises an annular disc 20 formed from a load bearing material. This material may be formed from a metal such as aluminium or from a suitable glass reinforced thermoplastic which is capable of taking the load without significant compression. The thickness of the annulus is less than the thickness of the interlayer. The outer edge of the annulus may have a groove machined into it. This groove assists in locating rubber O ring 22 which can be snapped into position around disc 20. Insert 14 is placed in position in the hole in the interlayer and the second glass ply 3 is placed on top of the interlayer. At this point the glass plies are resting on the surface of the O ring 22. The panel thus formed is subjected to a lamination process. The panel is inserted into a lamination bag and placed under vacuum so as to degas the panel. The panel is then placed in an autoclave and maintained at elevated temperature (say from 120° C. to 180° C.) and pressure (8 to 20 bar) for a period of 30 to 90 minutes. The rubber O ring is compressed and the inner faces of plies 1 and 3 are pressed into contact with the surface of disc 20.

The laminated panel produced can be moved to the location where it is to be incorporated into a glass assembly. If it is to be joined to a second panel as illustrated in FIG. 1 the bush 16, the gaskets 18 and the plates 6 are presented to the panel. The bolt is passed through the bush and the washers and nuts are screwed onto the bolt and tightened to the desired pressure. The disc 20 supports the load and prevents delamination of the interlayer.

The assembly of FIG. 4 may be constructed in a similar fashion. However the insert 14 should be a circular disc made of a flexible material such as a silicone rubber. The disc is conveniently a solid disc i.e. it is a circular disc rather than an annular disc. When the lamination process is complete the disc can be ejected from the laminate simply by pushing the centre of it. Once the disc has been removed the laminated panel is left with an annular void surrounding the bore. Such panels are believed to be novel and comprise a further aspect of the invention.

The void may be filled with a load bearing material. A convenient method of doing so is to inject a fluid material which will set to form a load bearing material. Examples of suitable materials include cements and castable resins. The suitability of any particular material for use in this invention may be determined by experiment. The preferred materials are free flowing, do not adhere to the glass, exhibit low shrinkage and are strong enough for the purpose. Care should be taken to avoid air being trapped in the void and thereby weakening the insert. Preferably the air will be pumped out of the void thus enabling the fluid to flow into the whole of the void.

When set the material is capable of supporting the load when the panel is compressed as described above and thereby the delamination of the panel is avoided.

The invention claimed is:

1. A method for producing a laminated panel comprising a first glass ply having a first glass ply inner face, a second glass ply having a second glass ply inner face, and a bonding interlayer, the method comprising laminating the first glass ply inner face to the second glass ply inner face with the bonding interlayer therebetween, said laminated panel having at least one bore extending through the panel wherein a sealing member is placed between the glass plies so as to surround the bore and form a seal with the inner faces of the glass plies thereby excluding the bonding interlayer from an area in between the first glass ply inner face and the second glass ply inner face that surrounds the bore and a load bearing insert is positioned in the area in between the first glass ply inner face and the second glass ply inner face that surrounds the bore from which the interlayer has been excluded.

2. The method according to claim 1 wherein the sealing member comprises a disc of a compressible material.

3. The method according to claim 1 further comprising removing the sealing member from the laminated panel after laminating the first glass ply inner face to the second glass ply inner face.

4. The method according to claim 1 wherein the sealing member comprises a ring of a compressible material.

5. The method according to claim 1 wherein the load bearing insert is positioned after the lamination process.

6. The method according to claim 5 wherein the load bearing insert is positioned by injecting a fluid into the area surrounding the bore and allowing the fluid to set to form the load bearing insert.

7. The method according to claim 6 wherein air is withdrawn from the area surrounding the bore at the same time that the fluid is introduced.

8. The method according to claim 1 wherein the sealing member comprises a ring of compressible material which extends around the perimeter of an annulus formed from a load bearing material and which is positioned prior to the lamination step.

9. The method according to claim 8 wherein thickness of the sealing member, prior to lamination, is greater than that of the annulus.

10. The method according to claim 9 wherein the ring of compressible material is compressed so that its thickness is substantially the same as that of the disc during the lamination process.

11. A laminated panel comprising a first glass ply having a first glass ply inner face, a second glass ply having a second glass ply inner face and a bonding interlayer therebetween, the first glass ply inner face being laminated to the second glass ply inner face by the bonding interlayer, the laminated panel having at least one bore passing through said panel, wherein the bonding interlayer is excluded from an area in between the first glass ply inner face and the second glass ply inner face that surrounds the bore and a load bearing insert is positioned in the area in between the first glass ply inner face and the second glass ply inner face that surrounds the bore and from which the interlayer has been excluded.

12. The panel according to claim 11 further comprising a sealing member positioned so as to surround the bore.

13. The panel according to claim 12 wherein said seal is formed by a ring of compressible material positioned so as to surround the bore.

14. The panel according to claim 13 wherein said insert comprises a load bearing disc which was positioned prior to producing the laminate.

15. The panel according to claim 13 wherein the insert comprises a load bearing annulus formed by a fluid that has been allowed to set, said fluid having been introduced into the area from which the interlayer has been excluded after the first glass ply has been laminated to the second glass ply.

16. A glass assembly comprising at least one laminated panel according to claim 11.

17. The assembly according to claim 16 comprising at least two laminated panels lying in the same plane and jointed to one another by means of fixing assemblies which pass through a bore in each panel.

18. The assembly according to claim 17 wherein the fixing assemblies comprise a bolt passing through a bore and acting on a plate which bridges the two panels.

19. The assembly according to claim 16 which is attached to or part of a glass façade or a glass roof.

* * * * *